April 25, 1967 R. C. KELLER 3,315,537
VIBRATION DAMPING CONNECTION
Filed April 12, 1965 2 Sheets-Sheet 2

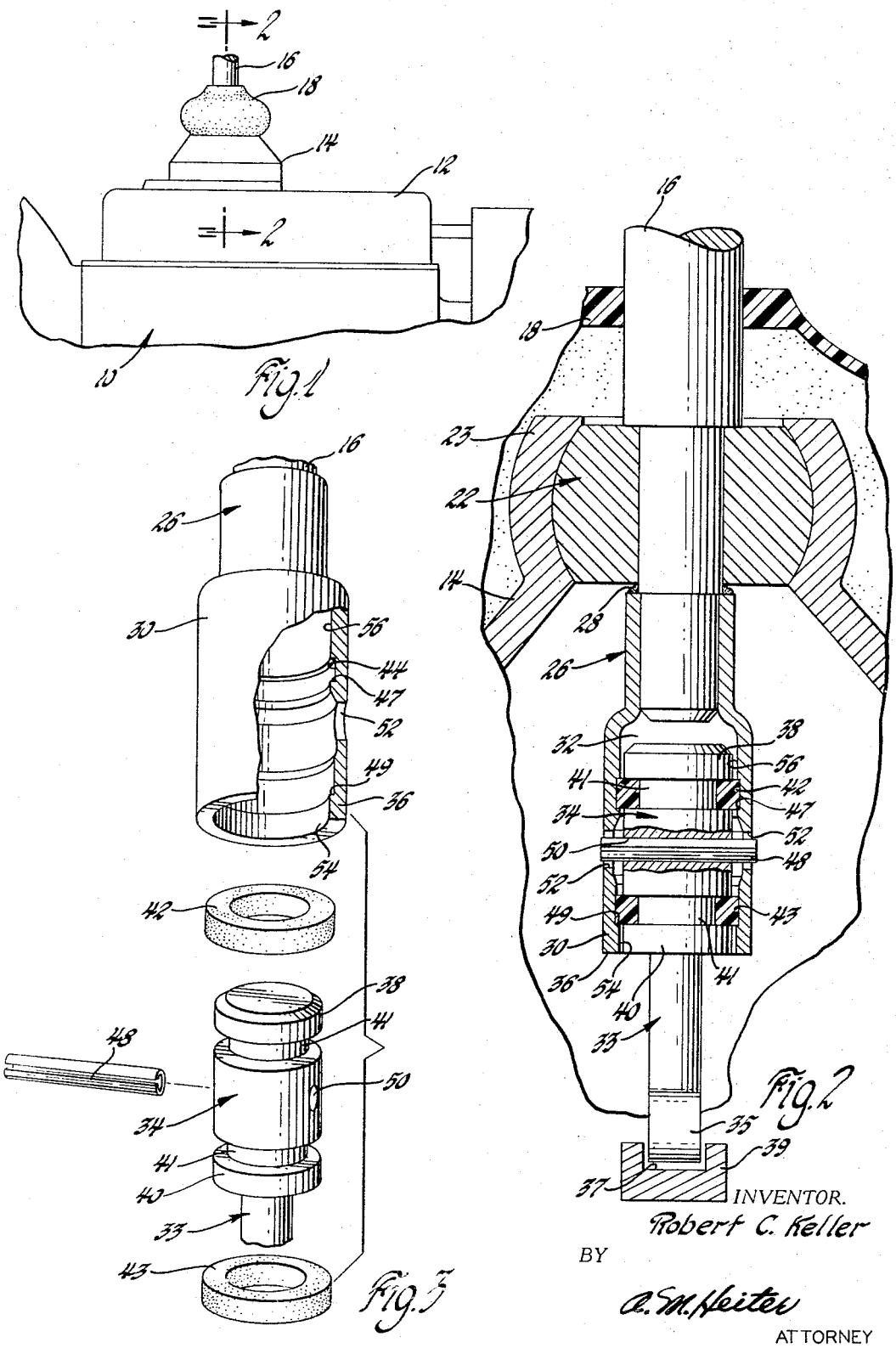

INVENTOR.
Robert C. Keller
BY
a. M. Heiter
ATTORNEY

United States Patent Office 3,315,537
Patented Apr. 25, 1967

3,315,537
VIBRATION DAMPING CONNECTION
Robert C. Keller, Birmingham, Mich., assignor to General Motors Corporation, Detroit, Mich., a corporation of Delaware
Filed Apr. 12, 1965, Ser. No. 447,213
18 Claims. (Cl. 74—519)

This invention relates to a connection for connecting members together which feature yielding means between the members to isolate the members from each other for vibration damping and provide member-to-member contact for force transmittal.

The present invention finds specific application in control levers and the like, such as those used in vehicles. The control lever for multi-speed transmissions, for example, which prior to this invention frequently experienced objectionable vibrations and resulting noise during normal vehicle operation. Such vibrations and noises are believed to come mainly from engine firing impulses and are transmitted by the transmission and the transmission control lever or other levers into the passenger compartment. However, it will be appreciated that such vibrations may come from other vehicle components or from road shocks.

The utilization of vibration damping materials such as rubber in control lever connections to abate the transmittal of vibratory energy has been met with only limited success due to the deterioration of such materials from friction, heat, petroleum products and ozone. Furthermore, the use of vibration damping materials for transmitting the control forces did not produce the desirable stabilized feel in operating the lever particularly if the lever was used to change the gear ratio in the transmission.

The present invention broadly provides for isolation of a first member from a second member through vibration damping means to abate the transmittal of vibratory energy to one of the members from the other member and further provides for a firm connection between the two members when one of the members is actuated.

It is an object of this invention to provide a new and improved coupling for connecting members which abates the transmittal of objectionable energy forms between the connected members.

Another object of this invention is to provide a coupling for joining members having yieldable means for securely connecting the members and for damping vibratory energy which would otherwise be transmitted from one member to another and having substantially rigid structure means for providing a positive connection for force transmittal.

Another object of this invention is to provide a coupling for connecting a plurality of members for the intermittent transmission of a high magnitude utilized force and blocking the vibration forces of lesser magnitude in which elastic vibration damping means are disposed between the members for member isolation and in which rigid lost motion structure is provided to rigidly connect the members subsequent to limited deformation of the vibration damping means for direct transmission of the utilized force.

Another object of this invention is to provide a new and improved control lever for operating a mechanism in which the control lever is pivotally mounted on a support and isolated from the pivot mounting by resilient structure and which can be grounded on the pivot in a metal-to-metal contact relationship when the lever is actuated to operate the mechanism.

Another object of this invention is to provide a movable transmission control lever for manipulating a transmission actuating member operatively connected to a multi-speed transmission, including a sleeve secured to one end of the control lever with the actuating member extending into the sleeve and being held therein and isolated therefrom by spaced vibration damping rings and having spaced contact lands thereon providing for a rigid connection for control force transmittal when the lever is utilized to change transmission gear ratios.

These and other objects of the invention will be more apparent from the following description and drawings, in which:

FIGURE 1 is a side elevation of a transmission and control lever assembly;

FIGURE 2 is a view taken along line 2—2 of FIGURE 1, and

FIGURE 3 is an exploded view of the preferred form of a coupling according to this invention;

Figure 4:
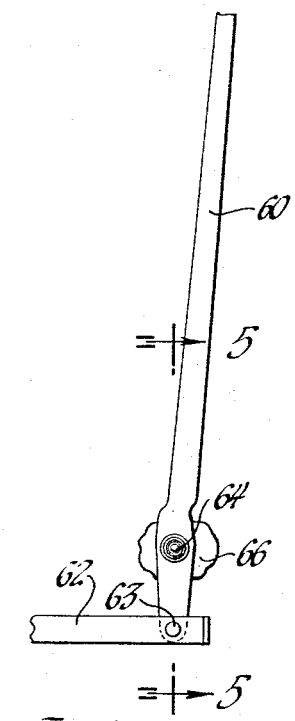
FIGURE 4 is a side elevation of a lever rotatably mounted on a support.

Referring now to the drawing, FIGURE 1 shows a multi-speed transmission 10 including cover 12 to which a housing 14 is secured by suitable means. Mounted in this housing is an elongated tranmission control lever 16 which is utilized to select available transmission drive ratios. A flexible boot 18, for sealing the control lever housing, is secured in a suitable manner to this housing and includes an upper opening which accommodates the elongated control lever.

As shown in FIGURE 2, the control lever is mounted for universal movement in the control lever housing by means of a ball and socket connection 22. The ball is secured to the lever 16 between the ends thereof by a press fit or any suitable means and is rotatable in corresponding ball socket 23. An elongated metallic tubular sleeve 26 is pressed on to the end of the control lever and may be additionally secured thereto by spot welds 28. The sleeve extends downwardly from the end of the lever and has an enlarged portion 30 providing a cylindrical chamber 32 which has an opening at one end for receiving one end of an elongated metallic transmission actuating member 33. The end of this chamber is formed with an annular inwardly-extending projection 36 for a purpose which will be later described.

One end of the actuating member 33 has an enlarged cylindrical head portion 34 with spaced annular, rigid contact lands 38 and 40, each having an outer periphery that clears the internal wall forming chamber 32. The head portion is further provided with laterally spaced annular grooves 41 in which spaced vibration damping rings 42 and 43 are mounted. These rings are preferably formed from materials which are resistant to deterioration by petroleum products, ozone, wear and ageing and which have a high damping capacity capable of dissipating the vibratory energy experienced by members 16 and 33. Thus, rings fabricated from polyurethane resins, polychloroprene, or butadiene acrylonitrile copolymers which resist deterioration and have large molecules and thus high molecular friction and high internal damping are suitable. In a specific preferred application, polyurethane having a Shore A scale hardness of 88±3 was found to have excellent vibration damping, memory and durability characteristics.

The rings are also preferably square or rectangular in cross-section. As shown, the peripheral surfaces of the rings fully engage the surfaces defining the grooves 41 in the head member, as well as surfaces forming grooves 44 and shoulders 47 and 49 in the sleeve member. Instead of spaced rings the vibration damper may be in the form of an elongated sleeve or, if rings are used they may have circular or other cross-sectional configurations. However, it has been found that the rings of square cross-section are preferable due to the fact that they will better retain and center the actuating member within the sleeve.

In their installed position in grooves 41, the rings are under slight or moderate compression. The force of recovery of these rings on head portion 34 and the inner wall defining chamber 32, securely holds and centers the actuating member within the sleeve member while providing a vibration damping connection between these two members. The other end 35 of the actuating member 33 extends into the transmission and is operatively engageable in the groove 37 of conventional transmission shifter heads 39, or equivalent structure (not shown), which may for example be similar to that of U.S. Patents 2,428,892 to Plexico or 3,064,493 to Popovich et al. The necessary conventional side clearance between head 39 and groove 37 tends to increase the vibration of actuator member 33.

A spring pin 48 is loaded and inserted through a transverse bore 50 provided in the head portion of the actuating member being retained therein by the force of recovery on the inner walls which form the bore. This pin extends through aligned apertures 52 in the tubular sleeve which provides a clearance fit. In case the ring connection is subjected to unusual wear and does not function to connect the actuator member and the tubular sleeve as intended, the pin will hold the actuating member in the sleeve so that the transmission control lever may still be utilized in shifting the transmission into selected drive ranges. This pin also serves to limit the rotation of the actuating member relative to the sleeve and control rod, which often occurs upon changing from one gear ratio to another. In this regard slight rotation of the actuating member on gear change slightly rotates the ring members, thus insuring even wear of the ring members.

The annular projection 36 and the internal wall of the tubular sleeve member provide bearing surfaces 54 and 56 to contact the lands of the actuating member. The clearance between the lands and bearing surfaces 54 and 56 is small and the rings have a sufficiently low stress level at the degree of compression required to permit the contact of the lands and bearing surfaces subsequent to application of sufficient operator force to lever 16 to effect a ratio change. When such ratio change is made, lever 16 and member 33 will initially be moved together to slide shifter head 39. However, as head 39 initially engages for ratio change, there is engagement reaction and relative movement between lever 16 and member 33 and until there is contact between the spaced lands and the sleeve. High magnitude apply force is then transmitted by the rigid connection as the lever and member are rotated as a solid lever to further move the shifter head 39 to complete the ratio change. In ratio change operation the apply force is not transmitted by the vibration damping ring members and it will be appreciated that the mechanical connection materially adds to ring member durability.

In the preferred embodiment there will be alternate metal-to-metal solid contact on gear changes. Thus in particular gear changes, one part of the lower land will contact a corresponding part of the bearing surface 54 while an opposite part of the upper land will contact the corresponding part of the internal wall of sleeve member 26. In other gear changes the alternate metal-to-metal contact will involve other alternate parts of the lands and cooperating bearing surfaces. It should be noted that in applicant's invention the forces due to vibration are not sufficient to make metal-to-metal contact but are sufficient to compress the material to provide high internal damping. The compression of the material during damping and the higher compression limited by metal-to-metal contact for force transmittal does not increase the stress level beyond a low value well within the elastic limit of the material so the material returns to its original configuration. After shift is accomplished, the sleeve and actuating member will be relatively centered and isolated by the vibrating damping material and any vibrations which the actuating member experiences will be damped and are not transmitted to the control lever. If repair of the actuating member is necessary the spring pin can be removed prior to removal of the actuating member which can then easily be repaired or replaced.

Figure 5:
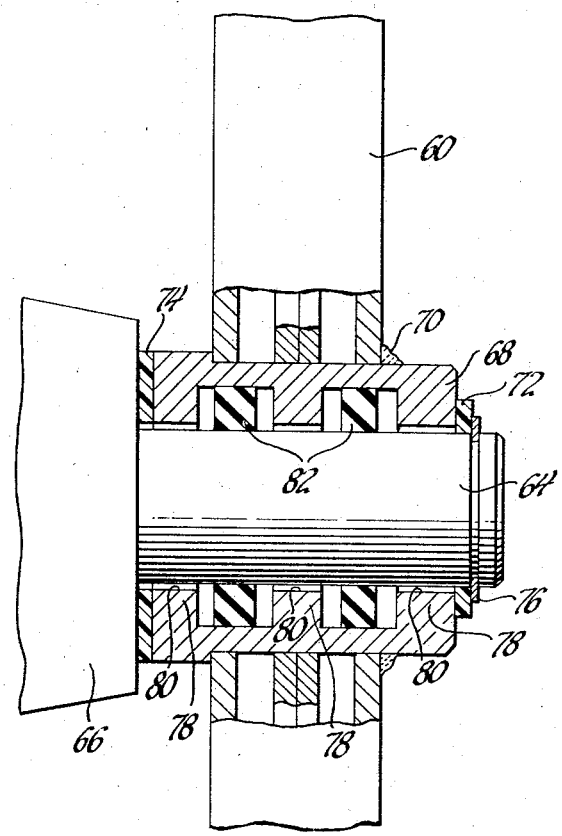
FIGURE 5 is a view taken along lines 5—5 of FIG. 4.

In FIGURE 4 illustrating another embodiment of applicant's invention, there is shown a lever arm 60 which may be used to operate vehicle brakes or other mechanism through linkage 62 connected to one end of the lever by pivot 63. The lever arm is pivotally mounted on a fulcrum 64 that extends from a supporting housing 66 which may be a vehicle transmission. As shown in FIG. 5, a cylindrical bushing 68 extends through the lever arm and surrounds the fulcrum 64. This bushing is joined with the lever in any suitable fashion, such as by spot weld 70, and therefore the lever arm and the bushing may be considered a single unit. The bushing is retained on fulcrum by means of washers 72 and 74 and a snap-type retainer ring 76. The washers are preferably non-metallic and are fabricated from polyurethane or other material which has good vibration damping qualities. Washer 74 is disposed between the end of the bushing and the housing and effectively separates the bushing from the housing. The bushing has spaced annular projections 78 which extend inwardly toward the fulcrum providing circular internal bearing surfaces 80 with a diameter slightly greater than the external diameter of the fulcrum 64 for a purpose which will be described.

Spaced damping elements 82, preferably in the form of rings, normally isolate the bushing and its attached lever arm from the fulcrum 64. The elements 82 are fabricated from any of the plastic materials defined in connection with the first embodiment. These materials present an external surface with a low coefficient of friction in order that the lever arm and the attached bushing may be turned without encountering excessive drag from the vibration damping material.

It will be appreciated that the washer and the damping elements 82 together combine to normally isolate the lever 60 from the support housing 66. It will, therefore, be apparent that any vibrations experienced by the housing 66 will not be transmitted to the lever arm through the fulcrum or the housing itself by virtue of the damping qualities of the vibration damping members. It will be seen that, upon rotation of lever 60, the vibration damping elements 82 will be deformed and there will be metal-to-metal contact between portions of the bearing surfaces 80 and external portions of the fulcrum 64. This grounding occurs when linkage 62 resists movement by operation of lever 60 and pivot 63 acts as a fulcrum. After the metal-to metal contact is made, further turning of lever 60 will laterally move linkage 62 and actuate the vehicle brakes or other mechanism to which lever 62 is connected. Upon release of the lever from operator force, the lever will again be centered and isolated from the fulcrum and the support. In this condition vibrations will not be transmitted from the support to the lever 60.

Figure 6:
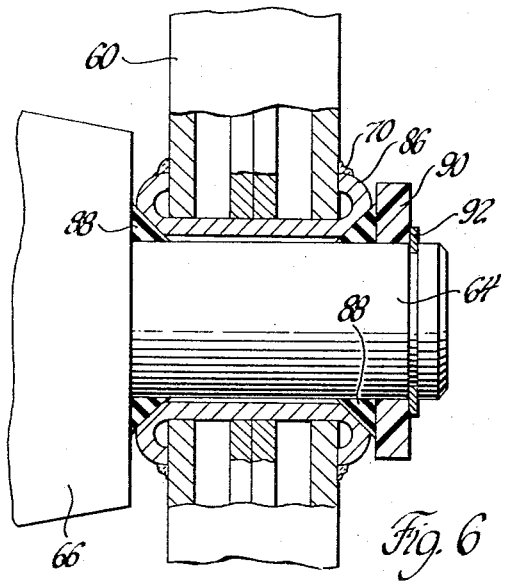
FIGURE 6 is a view similar to FIG. 5 but illustrating an additional embodiment of the invention.

In the embodiment of FIG. 6, which may be utilized in place of the FIG. 5 embodiment, a tubular bushing 86 is inserted through an opening in the lever 60 and secured to the lever in any suitable manner. This sleeve is provided at each end thereof with vibration damping members 88 which correspond in materials and function to the ring members of the FIGS. 2 and 5 embodiments. It will be noted that the members 88 project in part outboard of the bushing and effectively isolate the lever and the bushing from the housing 66 and the fulcrum 64 for vibration damping. Since one of the members 88 contacts the housing 66 and effectively spaces the bushing from housing 66 no inner washer is necessary as in the FIG. 5 embodiment. Bushing 86 and the lever are retained on the fulcrum by a suitable washer 90 and a snap ring 92. The FIG. 6 embodiment functions in substantially the same way as the FIG. 5 embodiment. When operator force is applied to lever 60 to actuate the linkage 62 the inner surface of the bushing 86 will ground on fulcrum 64 until such time as the apply force has been removed from lever 60. When the apply force has been removed, lever 60 will be returned to its centered position by action of the vibration damping members 88.

It will be seen that in all embodiments of applicant's construction, even if the resilient vibration damping members fail, the lever arm is still operative to operate the brakes or other mechanism in an efficient manner; however, vibrations will then, of course, be transmitted to the lever.

It will be appreciated that other modifications may be made to the present invention without departing from the spirit of applicant's teachings. It will also be understood that applicant is not to be restricted to the particular materials and embodiments shown and described but only to the invention as claimed.

I claim:

1. In a coupling for connecting relatively movable members, means on one of said members receiving a portion of the other of said members, vibration damping means between said first-mentioned means and said other of said members for holding said members together and providing a flexible connection therebetween while isolating said members from contact with each other, spaced rigid means on said other of said members for contacting opposed portions of said first-mentioned means subsequent to predetermined movement of one said member relative to the other said members, said rigid means providing an inflexible connection between said members to allow said members to be further moved as a one-piece member.

2. In a coupling for connecting first and second movable actuating members, a support, means pivotally mounting said members on said support, housing means secured to an end portion of one of said members and extending therefrom to receive an end portion of the other of said members, vibration damping means disposed between the internal walls of said housing means and the end portion of said other of said members normally isolating said members from contact with each other and connecting said members together, spaced rigid means on the end portion of said other of said members providing contact with opposing portions of the internal walls of said housing means subsequent to relative movement between said members, said members being movable as a unit in response to a force applied to one of said members until a reaction force retards movement of one of said members and causes compression of said vibration damping means and permits relative movement of said members, said rigid means then contacting opposing portions of the internal walls of said housing means and thereby providing a rigid connection between said members to allow the apply force on one of said members to overcome said reaction force and move the other of said members.

3. In a coupling for connecting a transmission control member to a transmission actuator member, sleeve means rigidly secured to an end portion of one of said members and extending therefrom to receive an end portion of said other member, vibration damping means rotatably mounted on said end portion of said member received within said sleeve member to normally isolate said members from each other and to permit relative movement between said members and to hold said members together, said end portion of said member received by said sleeve having first and second spaced lands thereon, said lands providing alternate contact with said sleeve subsequent to relative movement between said members to provide an inflexible drive connection between said members to allow said members to be moved as a unit without relative movement therebetween.

4. In a coupling for connecting a transmission control lever to a transmission actuator member, a connector member rigidly secured to an end portion of said control lever having a chamber therein for receiving an end portion of said actuator member, vibration damping means disposed between said end portion of said actuator member and the walls of said connector member defining said chamber for insulating said members from each other while holding said members together, first and second spaced contact members secured to said end portion of said actuator member within said connector member adapted to contact alternate portions of said connector member to provide an inflexible drive connection between said members and permit said control lever and said actuator member to be further moved as a solid lever.

5. In a coupling for connecting a transmission control lever to a relatively movable transmission actuator member, a connector member rigidly secured to an end portion of said control lever having a chamber therein for receiving an end portion of said actuator member, elastic means movably mounted on said end portion of said actuator member and contacting the walls of said connector member defining said chamber for supporting said actuator member in said connector member and damping vibrations experienced by said actuator member and said control lever, first and second spaced contact members secured to said end portion of said actuator member within said connector member adapted to contact alternate portions of said connector member to provide an inflexible drive connection between said members subsequent to predetermined relative movement of said control lever and said actuator member.

6. In combination with a multi-speed transmission, a shift control lever movably mounted with respect to said transmission and having a connector member secured to one end thereof, an elongated transmission actuating member operatively connected to said transmission having a head portion extending into said connector member, resilient means positioned between said head portion and said connector for securing said actuating member to said connector member and for isolating said actuating member and said connector member and for damping vibrations experienced by said actuating member, and said head portion having spaced contact means thereon for contacting said connector member to enable said lever to move said actuating member and condition said transmission for a selected drive ratio.

7. In combination with a multi-speed transmission, a housing mounted on said transmission, an elongated shift control lever rotatably mounted in said housing and having one end extending outwardly therefrom, a hollow sleeve member secured to the other end of said lever within said housing and providing a chamber, an elongated transmission actuating member operatively connected to said transmission having a head portion extending into said chamber, spaced annular ring members positioned between said head member and the wall of said sleeve member which defines said chamber, said ring members providing means for damping vibrations experienced by said actuating member and to securely connect said actuating member within said sleeve member, said head portion having spaced annular contact means for rigid engagement with the internal walls of said sleeve member subsequent to predetermined movement of said control lever relative to said actuating member to enable said lever to move said actuating member without further relative movement and condition said transmission for selected drive ratios.

8. In combination with a multi-speed transmission, a housing mounted on said transmission, an elongated transmission shift control lever mounted for universal movement in said housing, said lever having one end extending externally of said transmission and the other end extending in said housing, a sleeve member having one end fitted on the end of said lever within said housing and providing a chamber, an elongated actuating member having an enlarged head portion extending into said chamber and a finger portion operatively engaged with transmission gearing, said head portion having first and second spaced grooves therein, said sleeve member having an internal groove and a spaced shoulder portion, first and second resilient means for securing said actuating member in said sleeve and to damp vibrations experienced by said actuating member, first resilient ring means disposed in one of said grooves in said head portion and said groove in said sleeve member, said second resilient ring means being spaced from said first resilient means and disposed in the other of said grooves in said head portion and contacting the walls of said sleeve member defining said chamber, said second ring means being in contact with said shoulder portion, said head portion having a lateral bore therein, a pin extending through said bore and aligned apertures formed in said sleeve, said apertures providing a clearance fit for the ends of said pin, said head portion having spaced contact lands for contacting alternate portions of said sleeve member to provide a stable connection between said control lever and said actuating member.

9. In combination with a multi-speed transmission, a housing mounted on said transmission, an elongated shift control lever movably mounted in said housing and having one end extending outwardly therefrom, a member secured to the other end of said lever within said housing and providing a chamber, an elongated transmission actuating member operatively connected to said transmission having a head portion extending into said chamber, said head portion having spaced contacts thereon, compressible means positioned between said head member and the wall of said sleeve member which defines said chamber to space said contacts from the walls defining said chamber, said compressible means being of a material having high damping capacity to damp vibrations experienced by said actuating member and to permit said contacts to engage the walls defining said chamber on application of a force applied to said lever for changing transmission speeds.

10. In combination, support means, lever means pivotally supported by said support means for limited rotary movement with respect to said support means, said lever means including an input lever arm and an output lever arm, a housing supported by said lever means, a member extending into said housing, vibration damping means spaced within said housing normally isolating said housing from said member to damp vibrations experienced by said member, said vibration damping means being deformable in response to predetermined apply force on said input lever arm when said output lever arm experiences a predetermined reaction force to permit contact of said member and said housing and permit said input lever arm to move said output lever arm without further deforming said vibration damping means, said vibration damping means having a force of recovery sufficient to isolate said member and said housing on removal of said apply force.

11. The device defined in claim 10 wherein said member is rigidly secured to one of said lever arms.

12. The device defined in claim 10 wherein said member is secured to said support means and provides a pivot for mounting said lever means on said support means.

13. The device defined in claim 10 wherein said member is secured to said support means and provides a pivot for mounting said lever means on said support means, said vibration damping means being formed by first and second spaced members and wherein projecting means formed inwardly of said housing provide mechanical contact with said member.

14. In combination, support means, lever means pivotally supported by said support means for movement with respect to said support means, said lever means including an input lever arm and an output lever arm, a housing supported by said lever means, vibration damping disposed within said housing normally isolating said housing from said member to damp vibration experienced by said member, said vibration damping means being deformable in response to predetermined apply force on said input lever arm when said output lever arm experiences a predetermined reaction force to permit contact of said member and said housing, said vibration damping means having a force of recovery sufficient to isolate said member and said housing on removal of said apply force, said vibration damping means being formed by spaced ring members positioned at the ends of said housing and said housing having a continuous surface for member-to-housing contact.

15. In combination, a lever member, pivot means rotatably supporting said lever member, vibration damping means disposed between said pivot member and said lever member normally isolating said lever member from said pivot means to damp vibratory energy experienced by said pivot means and thereby substantially diminish transmittal of such vibratory energy to said lever member, said lever including means to provide member-to-member contact when said lever has been actuated and resistance to rotation is experienced at one end of the lever.

16. In a lever assembly, a first member having an internal cylindrical surface, a second member having an external cylindrical surface located in said first member, a substantial clearance between said internal and external cylindrical surfaces, a pair of annular rings having a radial thickness substantially greater than said clearance, annular recess means on at least one of said members axially locating said rings and contacting the internal and external surfaces of said rings to support said members relative to each other to normally maintain said substantial clearance, said rings being made of a plastic material having high internal friction to damp relative movement between said members due to vibration of one of said members to prevent contact between said members and transmission of vibratory forces from said one member to the other member, said rings being further deformable within the elastic limit of said plastic material to permit contact between said internal and external surfaces of said members in response to an operating force higher than said vibratory force to transmit said operating force directly from one member to the other member and permit one member to directly move the other member without further deformation of said plastic material.

17. In a coupling for connecting movable members, means pivotally mounting one of said members, means forming part of one of said members for receiving a portion of another of said members, elastic means of a material having high internal friction located between said second mentioned means and one of said members for holding said members together and providing a flexible vibration damping connection therebetween while isolating said members from contact with each other, said elastic means being deformable in response to application of a predetermined apply force to one of said members to permit relative movement of said members, rigid means on one of said members to contact another of said members subsequent to relative movement of said members to provide an inflexible connection therebetween allowing said members to be pivoted as a one-piece member and transmit said apply force without further deformation of said elastic means.

18. In a coupling for connecting two members for the intermittent transmission of a high magnitude utilized force between the members and blocking the transmission of vibration forces of lesser magnitude when the utilized force is not being transmitted, each of said members having rigid lost motion means having a normal spaced apart position having a space between all portions of both members and operative in response to a predetermined limited relative movement in all angular directions of one of said members by said utilized force to positively engage for direct rigid mechanical transmission of said utilized force to said other member, elastic means having high internal friction to damp vibration connected to both said members and holding both said members in said normally spaced apart position and limiting relative movement of said members in response to said forces of lesser magnitude to move less than said predetermined limited relative movement of said lost motion means to damp vibration of and between said members and operative in response to said utilized forces of higher magnitude to permit said predetermined limited relative movement for said positive engagement for the transmission of said utilized force by elastic deformation within the elastic limit of said elastic means to enhance the life of said elastic means.

References Cited by the Examiner
UNITED STATES PATENTS

| | | | |
|---|---|---|---|
| 2,147,163 | 2/1939 | Jimerson | 287—53 |
| 2,596,821 | 5/1952 | Parkins | 287—119 |
| 2,846,036 | 8/1958 | Maurice et al. | 74—522 |
| 2,995,041 | 8/1961 | Rowan | 74—519 |

FRED C. MATTERN, Jr., *Primary Examiner.*

W. S. RATLIFF, *Assistant Examiner.*